T. LOFTUS.
HOSE PIPE-COUPLING.
No. 178,649. Patented June 13, 1876.
Fig. 1.
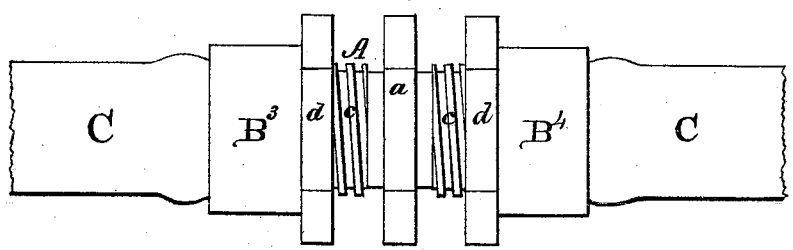
Fig. 2.
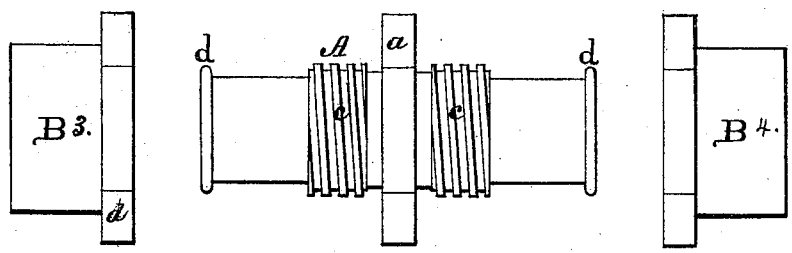
Fig. 3. Fig. 4.
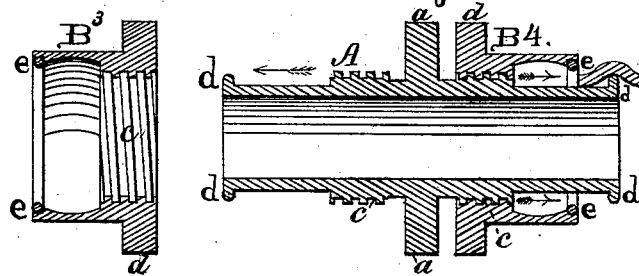 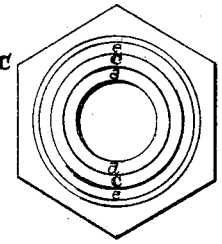
Witnesses;
Edward H. Hoppe.
A. A. Cook.
Inventor;
Thomas Loftus

UNITED STATES PATENT OFFICE.

THOMAS LOFTUS, OF SACRAMENTO, CALIFORNIA, ASSIGNOR OF ONE-HALF HIS RIGHT TO BENJAMIN BULLARD, JR., OF SAME PLACE.

IMPROVEMENT IN HOSE-PIPE COUPLINGS.

Specification forming part of Letters Patent No. 178,649, dated June 13, 1876; application filed February 5, 1876.

*To all whom it may concern:*

Be it known that I, THOMAS LOFTUS, of the city and county of Sacramento and State of California, have invented a new and Improved Hose-Pipe Coupling; and I do hereby declare that the following is a full, clear, and exact description of the same.

The coupling is formed by an exteriorly threaded and flanged tube, and two interiorly-threaded tubes, which screw on the former and clamp the hose, as hereinafter described.

In the drawing, Figure 1 is a plan view of the coupling complete, and section of hose secured thereto. Fig. 2 represents the three tubes composing the coupling detached. Fig. 3 is a vertical section. Fig. 4 is an end view.

The chief part of the coupling is the long tube A, which has a central circumferential flange, $a$, a screw-thread, $c$, on each side thereof, and a bead, $d$, at each end. The short tubes $B^3$ $B^4$ have a similar external flange, $d$, and an internal screw-thread, $c$, at one end, and ring or bead $e$ at the other end. The tube $B^3$ screws on one end of the tube A, and the tube $B^4$ on the other. The ends of hose C are stretched and drawn over the beaded ends $d$ of tube A, and the tubes $B^3$ $B^4$ screwed back in direction of the arrows, Fig. 3, to clamp the hose between the bead $d$ and ring $e$. The extreme ends of the hose contract around the plain reduced portion of tube A, between the screw-thread $c$ and beads $d$ thereof. The friction of the hose with the bead $d$, and the pressure of the ring $e$ upon the inner side of the beads, causes the hose to be secured more firmly than in other couplings of this class. The coupling as a whole is composed of a minimum number of parts, and is therefore simple and inexpensive, yet very efficient and easily operated.

What I claim is—

The improved coupling, composed of the long tube A, having screw-threads, central flange, and beads, and the flanged and internally-threaded tubes $B^3$ $B^4$, all constructed and arranged to operate as shown and described.

THOMAS LOFTUS.

Witnesses:
 EDWARD H. HOPPE,
 A. A. COOK.